(12) United States Patent
Furusho (10) Patent No.: US 7,592,901 B2
(45) Date of Patent: Sep. 22, 2009

(54) INPUT DEVICE

(75) Inventor: Hidetaka Furusho, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 360 days.

(21) Appl. No.: 11/574,131

(22) PCT Filed: Aug. 10, 2005

(86) PCT No.: PCT/JP2005/014638

§ 371 (c)(1),
(2), (4) Date: Feb. 22, 2007

(87) PCT Pub. No.: WO2006/022140

PCT Pub. Date: Mar. 2, 2006

(65) Prior Publication Data

US 2009/0021354 A1      Jan. 22, 2009

(30) Foreign Application Priority Data

Aug. 25, 2004   (JP) .............................. 2004-245040

(51) Int. Cl.
H04B 3/36 (2006.01)
G08B 5/22 (2006.01)
G09G 3/34 (2006.01)
G09G 5/00 (2006.01)
G06F 3/041 (2006.01)
G06F 3/042 (2006.01)
G09B 21/00 (2006.01)

(52) U.S. Cl. .................. 340/407.1; 340/407.2; 340/7.6; 345/108; 345/156; 345/173; 345/174; 345/175; 345/176; 345/177; 434/112; 434/113; 434/114

(58) Field of Classification Search ............. 340/407.1, 340/407.2, 7.6; 345/156, 173–177; 434/112, 434/113, 114

See application file for complete search history.

(56) References Cited

U.S. PATENT DOCUMENTS 5,610,838 A * 3/1997 Tokioka et al. ................ 702/56

(Continued)

FOREIGN PATENT DOCUMENTS

JP         63-105416         5/1988

(Continued)

OTHER PUBLICATIONS

International Search Report for International Application No. PCT/JP2005/014638.

*Primary Examiner*—Benjamin C Lee
*Assistant Examiner*—Lam P Pham
(74) *Attorney, Agent, or Firm*—Brinks Hofer Gilson & Lione (57) ABSTRACT

There are provided an input means 2 that allows information to be input as touched by an operator, a vibration application means 3 disposed on a back side of the input means 2, and a control means 5. The input means 2 is a touch panel 6. The vibration application means 3 is shaped like a flexible sheet, and includes a plurality of actuators 17 arranged as vibration sources. Each of the actuators 17 includes a first electrode 13, a second electrode 14, and an insulating layer 15 is provided between the first electrode 13 and the second electrode 14 and containing a ferroelectric layer. The control means 5 drives a preset actuator 17 of the actuators 17 according to input from the control panel 6.

4 Claims, 5 Drawing Sheets

U.S. PATENT DOCUMENTS

| | | | | |
|---|---|---|---|---|
| 5,936,207 A | * | 8/1999 | Kobayashi et al. | 178/18.01 |
| 6,753,846 B2 | * | 6/2004 | Takeuchi et al. | 345/108 |
| 6,819,312 B2 | * | 11/2004 | Fish | 345/156 |
| 7,088,347 B2 | * | 8/2006 | Iisaka et al. | 345/177 |
| 7,119,798 B2 | * | 10/2006 | Yoshikawa et al. | 345/173 |
| 7,193,617 B1 | * | 3/2007 | Kanbara et al. | 345/177 |
| 7,224,343 B2 | * | 5/2007 | Rekimoto | 345/156 |
| 2003/0067449 A1 | | 4/2003 | Yoshikawa et al. | |
| 2003/0179190 A1 | * | 9/2003 | Franzen | 345/173 |

FOREIGN PATENT DOCUMENTS

| | | |
|---|---|---|
| JP | 2003-122507 | 4/2003 |
| JP | 2004-021697 | 1/2004 |
| JP | 2004-094389 | 3/2004 |

* cited by examiner

INPUT DEVICE

TECHNICAL FIELD

The present invention relates to an input device that is suited to give feedback on an input operation to an operator by means of vibration when the operator performs the input operation by pressing the input device.

BACKGROUND ART

In various electronic apparatuses, such as a mobile telephone, a personal digital assistant (PDA), an automated teller machine (ATM), a car navigation system, a digitizer of a computer, and a remote control, an input device through which an operator inputs information has been used hitherto.

As such an input device, an input device has been proposed in which feedback on an information input operation is given to an operator by means of vibration when the operator performs the input operation by pressing the input device (for example, see Japanese Unexamined Patent Application Publication No. 2004-021697).

Another input device has been proposed in which feedback on an input operation of information is given to an operator in accordance with the type of the information when the operator performs the input operation by pressing the input device (for example, see Japanese Unexamined Patent Application Publication No. 2004-094389).

In recent years, various apparatuses have been required to have higher performance. As one method for increasing the performance of the apparatuses, an input device has also been required to reduce power consumption and improve operability.

That is, while conventional input devices can give feedback on an input operation to an operator by means of vibration, they consume much power because a control panel or a support substrate for supporting the control panel is vibrated entirely.

Moreover, since the control panel or the support substrate for supporting the control panel is entirely vibrated in the conventional input devices, the control panel is vibrated, regardless of which position is operated for input. Therefore, it is impossible to determine whether the input operation is proper, and an input error of performing an input operation on a position different from a correct position sometimes occurs, for example, an adjacent input position is pressed inadvertently. That is, operability is low. This input error becomes more remarkable as the area of the operating portion decreases.

Accordingly, an object is to provide an input device that can easily reduce power consumption and improve operability.

The present invention has been made in view of these circumstances, and an object of the invention is to provide an input device that can easily reduce power consumption and improve operability.

DISCLOSURE OF INVENTION

Problems to be Solved by the Invention

In order to achieve the above-described object, an input device according to the present invention includes an input means that allows information to be input as touched by an operator; a vibration application means disposed on a back side of the input means so as to vibrate the input means; and a control means for controlling operations of the input means and the vibration application means. The input means is a sheet-shaped flexible control panel to which coordinates are input. The vibration application means is shaped like a flexible sheet, and includes a plurality of actuators arranged as vibration sources. Each of the actuators includes a first electrode, a second electrode, and an insulating layer is provided between the first electrode and the second electrode and containing a ferroelectric layer. The control means drives a preset actuator of the actuators according to at least coordinate information from the control panel.

An input device according to another aspect of the present invention includes an input means that allows information to be input as touched by an operator; a vibration application means disposed on a back side of the input means so as to vibrate the input means; a secondary input means disposed on a back side of the vibration application means, and including at least one switch that performs switching in response to a pressing force applied to the input means; and a control means for controlling operations of the input means, the vibration application means, and the secondary input means. The input means is a sheet-shaped flexible control panel to which coordinates are input. The vibration application means is shaped like a flexible sheet, and includes a plurality of actuators arranged as vibration sources. Each of the actuators includes a first electrode, a second electrode, and an insulating layer is provided between the first electrode and the second electrode and containing a ferroelectric layer. The control means drives a preset actuator of the actuators according to at least coordinate information from the control panel or a signal output from the switch.

In the present invention, preferably, the insulating layer is disposed adjacent to the first electrode and the second electrode in a direction parallel to a surface of the input means, and one of two adjacent actuators shares the electrode with the other actuator.

The actuators may be provided in multiple layers with an interlayer insulating layer disposed between the layers. The insulating layer may be shaped like a sheet, and the first electrode and the second electrode may be provided on both sides of the insulating layer in the thickness direction in a manner such as not to overlap with each other. Further, the first electrode, the insulating layer, and the second electrode in each actuator may be stacked in the thickness direction, and one of the first electrode and the second electrode may be divided.

In the present invention, preferably, a sound generation means for generating audible sound is also provided, and the sound from the sound generation means is formed by vibration of the electrodes caused when the actuator is driven.

Since the control panel can be locally vibrated in the input device of the present invention, excellent advantages are provided, for example, power consumption can be reduced and operability can be improved.

BEST MODE FOR CARRYING OUT THE INVENTION

The present invention will be described below with reference to embodiments shown in the drawings.

Figure 1:
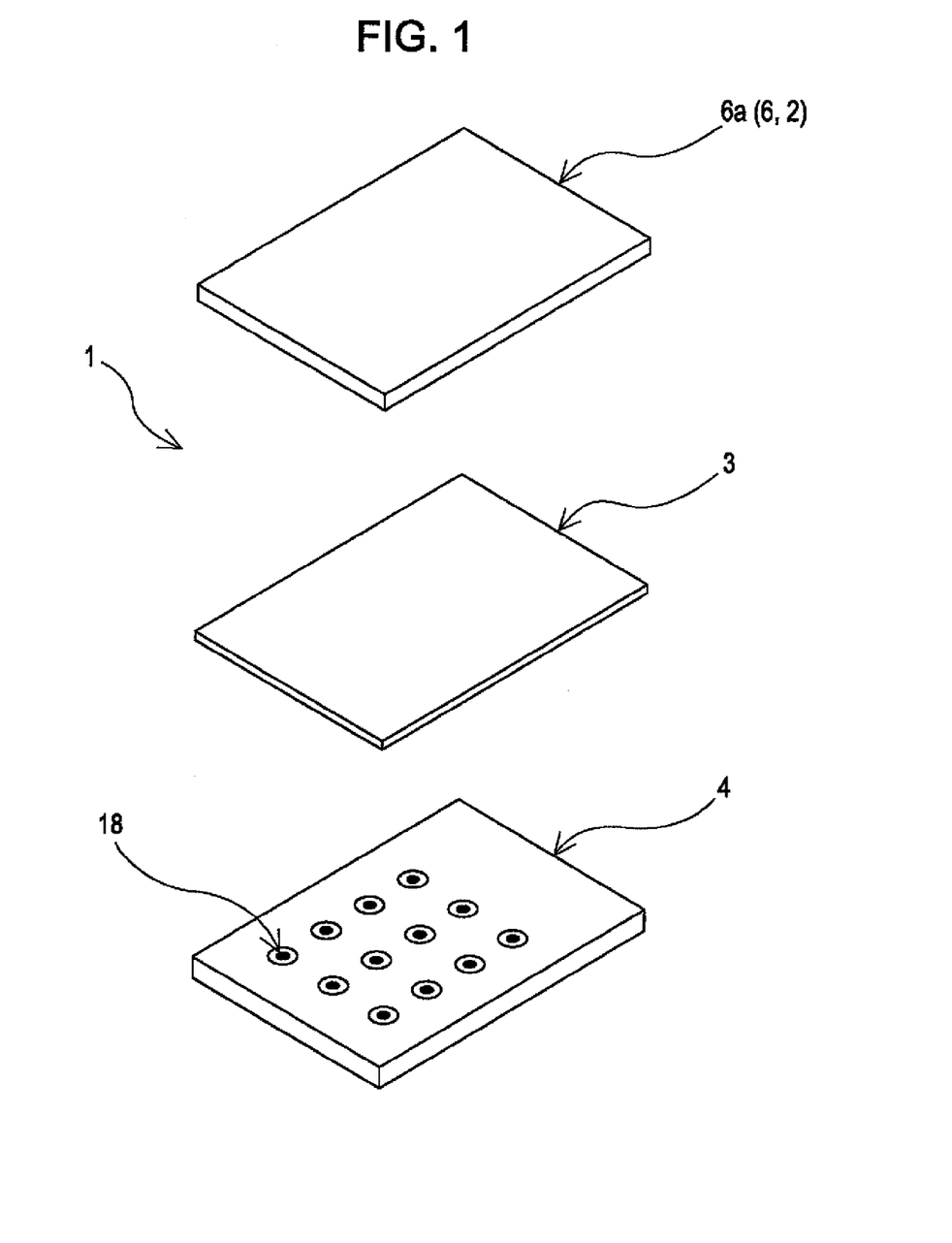
FIG. 1 is an exploded schematic perspective view of the principal part of an input device according to a first embodiment of the present invention.
Figure 2:
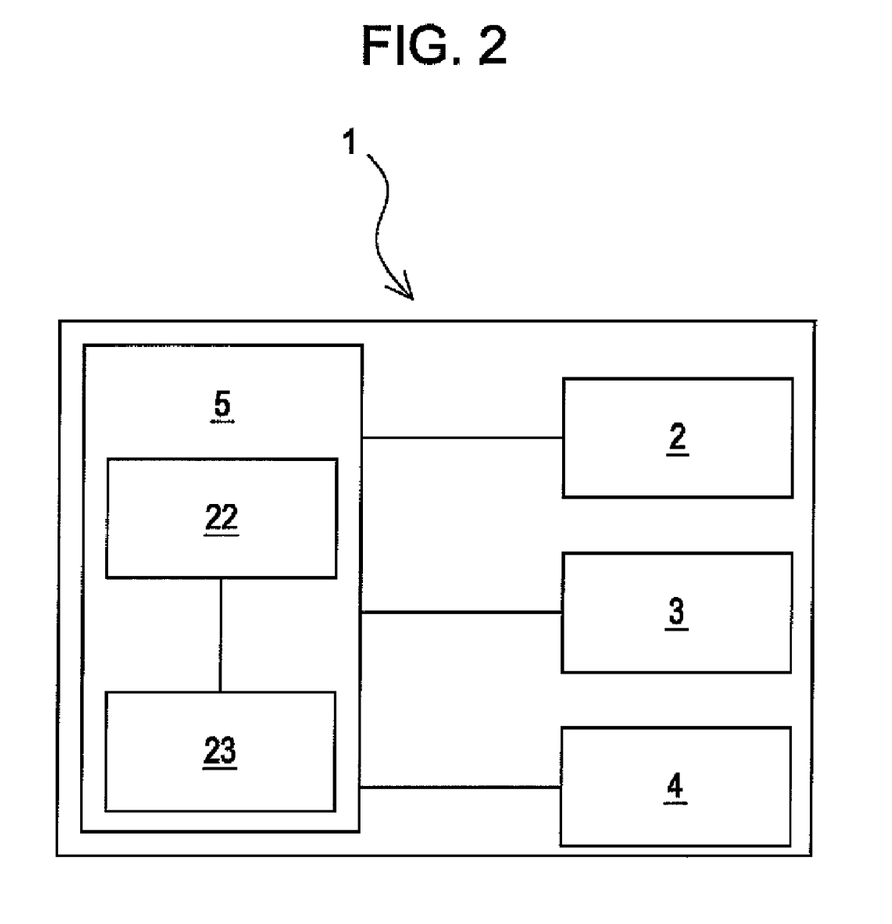
FIG. 2 is a functional block diagram of the principal part of the input device shown in FIG. 1.
Figure 3:
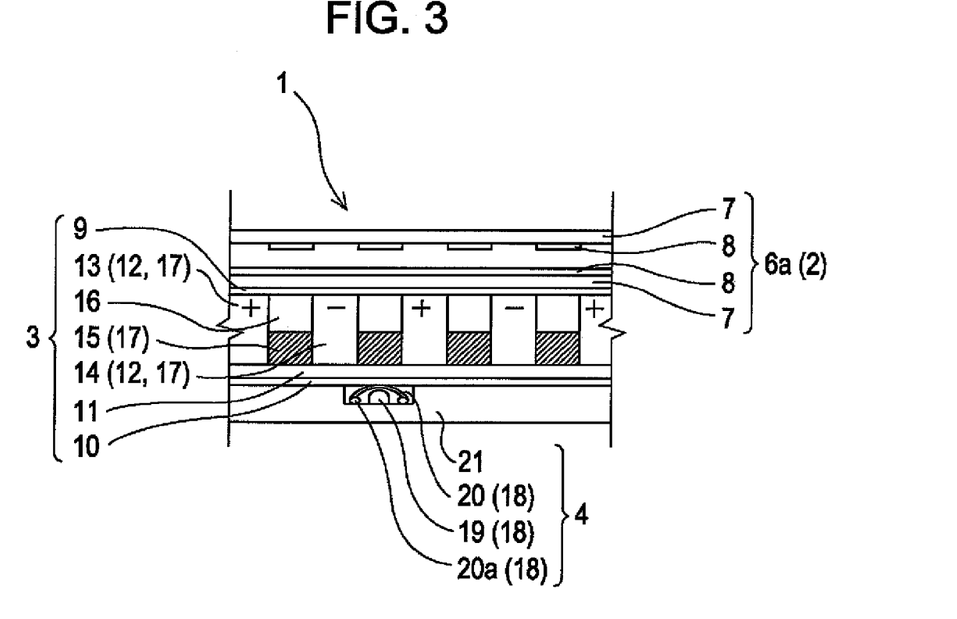
FIG. 3 is an exaggerated cross-sectional view of the principal part of the input device shown in FIG. 1.

FIGS. 1 to 3 show an input device according to a first embodiment of the present invention. FIG. 1 is an exploded schematic perspective view of the principal part, FIG. 2 is a functional block diagram of the principal part, and FIG. 3 is an exaggerated cross-sectional view of the principal part.

As shown in FIG. 1, an input device 1 of this embodiment includes an input means 2, a vibration application means 3, and a secondary input means 4. The input means 2, the vibration application means 3, and the secondary input means 4 are electrically connected to a control means 5, as shown in FIG. 2. The input device 1 of this embodiment is mounted in a case (not shown) having a predetermined shape in accordance with the application, for example, in main cases of various electronic apparatuses.

The input means 2 allows information to be input as touched by an operator. A known type of sheet-shaped flexible control panel 6, in this embodiment, a touch panel 6a capable of coordinate input is used as the input means 2.

As shown in FIG. 3, the touch panel 6a of this embodiment includes a pair of flat, flexible, and transparent film substrates 7 each formed of an insulating material, such as polyester, polyimide, or polyethylene terephthalate, and having a thickness of approximately 150 μm. Conductor patterns 8, each formed of a transparent conductive film, such as ITO (indium tin oxide), and having a predetermined pattern, are provided on opposing surfaces of the film substrates 7. The conductor patterns 8 on the film substrates 7 are arranged at a predetermined pitch such as to form stripes as a whole. The conductor patterns 8 on the film substrates 7 face each other in a matrix, and intersections of the conductor pattern 8 on one of the film substrates 7 and the conductor patterns 8 on the other film substrate 7 serve as intersections on the x and y coordinates. Further, short-circuit preventing transparent dot spacers (not shown) are arranged between the conductor patterns 8 of the film substrates 7 so that the conductor patterns 8 are not in contact with each other in a normal state.

Other structures of the touch panel 6a are similar to those of a known touch panel, and therefore, detailed descriptions and illustrations thereof are omitted.

When the surface of the touch panel 6a having this configuration is pressed, for example, by the finger of the operator, a pressed portion is elastically deformed downward in the thickness direction by the pressing force. The conductor pattern 8 of one of the film substrates 7 and the conductor pattern 8 of the other film substrate 7 are brought into contact with each other by the elastic deformation, so that a current flows therebetween. The control means 5 can determined, on the basis of the intersection on the x and y coordinates, what portion of the touch panel 6a is pressed by the operator.

The control panel 6 may be one of known flat sensors capable of coordinate input, for example, a capacitive sensor or an induction sensor.

The vibration application means 3 serves to apply vibration to the input means 2 so as to reply to the pressing operation by the operator with a reaction force. The vibration application means 3 is shaped like a flexible sheet as a whole. As shown in FIG. 1, the vibration application means 3 is provided on the back side of the input means 2.

As shown in FIG. 3, in the vibration application means 3 of this embodiment, a pair of upper and lower substrates 9 and 10 are disposed parallel to each other and with a space of approximately 100 μm therebetween. The upper and lower substrates 9 and 10 are formed of flat, flexible and transparent plates made of an insulating material, such as polyester, polyimide, or polyethylene terephthalate, and having a thickness of approximately 10 μm. An elastic low dielectric layer 11 formed of an elastic low dielectric material, such as acrylic or silicone, and having a thickness of approximately 20 μm is provided on an upper surface of the lower substrate 10. The elastic low dielectric layer 11 serves to reliably prevent a short circuit between electrodes 12, which will be described below, and may be provided, as necessary for a design concept or the like.

Electrodes 12 formed of a transparent conductive film, such as ITO (indium tin oxide), are arranged in stripes and at a predetermined interval between the elastic low dielectric layer 11 and the upper substrate 9. These electrodes 12 are arranged so that there is a potential difference between the adjacent electrodes 12. For example, two types of electrodes 12, that is, first electrodes 13 having a positive polarity in a current applied state and second electrodes 14 having a negative polarity are arranged alternately. The electrodes 12 are electrically connected to an unillustrated external driving circuit. The passage of current through the electrodes 12 is controlled according to a control command sent from the control means 5.

The form of the potential applied to the electrodes 12 may be one of various forms such as a direct current, an alternating current, and a pulse. When a direct current is used, it is important to exert on/off control in a short period in order to vibrate insulating layers 15 by means of an electrostrictive effect.

Insulating layers 15 to be vibrated by an electrostrictive effect are provided between the electrodes 12, as shown by diagonally shaded regions in FIG. 3. The insulating layers 15 may be formed of a ferroelectric material, preferably, an elastic ferroelectric material in which a ferroelectric material is contained in a transparent silicone rubber. The ferroelectric material is, for example, bismuth titanate or barium titanate.

That is, the insulating layers 15 containing ferroelectric layers are provided between the first electrodes 13 and the second electrodes 14.

Each insulating layer 15 has both side faces in contact with the electrodes 12, a lower surface in contact with the elastic low dielectric layer 11, and an upper surface disposed below a lower surface of the upper substrate 9 with a space 16 therebetween. An elastic low dielectric layer 11 for avoiding a short circuit between the electrodes 12 can be provided in the space 16, as necessary for the design concept or the like.

The first electrodes 13, the second electrodes 14, and the insulating layers 15 is provided between the first electrodes 13 and the second electrodes 14 constitute actuators 17 serving as vibration sources in this embodiment.

Therefore, the vibration application means 3 of this embodiment includes the actuators 17 serving as the vibration sources, and each of these actuators 17 includes the first electrode 13, the second electrode 14, and the insulating layer 15 containing a ferroelectric layer and provided between the first electrode 13 and the second electrode 14.

The insulating layer 15 serving as a constituent of the actuator 17 is adjacent to the first electrode 13 and the second electrode 14 in a direction parallel to a surface in the right-left direction of FIG. 3. In the two adjacent actuators 17, one of the actuators 17 can share the electrode 12 with the other actuator 17.

That is, the insulating layer 15 can be vibrated by a potential difference between the first and second electrodes 13 and 14 disposed beside the insulating layer 15.

The vibration application means 3 may have any structure that allows the insulating layers 15 to be vibrated by the passage of current through the electrodes 12.

It is satisfactory as long as current is passed through the electrodes 12 so as to produce a potential difference between the first and second electrodes 13 and 14. The first and second electrodes 13 and 14 may have the same polarity when there is a potential difference therebetween.

When the surface of the touch panel 6a serving as the input means 2 is pressed, for example, by the finger of the operator, an operated (pressed) portion of the vibration application means 3 is displaced downward in the thickness direction along with the touch panel 6a. Of course, when the pressing force is removed from the surface of the touch panel 6a, the operated portion is returned to its initial state.

In a case in which the input device 1 of this embodiment is placed on a screen of a display of an electronic apparatus, for example, a screen of an ATM, it is important for at least a portion of the vibration application means 3 placed on the screen to be transparent. In this case, it is preferable that a material capable of ensuring transparency, such as zinc oxide, be used as the ferroelectric material of the insulating layers 15.

In a case in which the input device 1 of this embodiment is used in a control unit of an electronic apparatus, for example, in a control unit of a mobile telephone where control keys are arranged, it may be determined whether to give transparency to the vibration application means 3, as necessary for the design concept or the like.

When the surface of the touch panel 6a serving as the input means 2 is pressed, for example, by the finger of the operator, the secondary input means 4 can perform a switching operation by using the pressing force. The secondary input means 4 is provided on the back side of the vibration application means 3, as shown in FIG. 1.

As shown in FIG. 3, the secondary input means 4 of this embodiment includes a plurality of switches (only one switch is shown in FIG. 3) 18 arranged such as to oppose the insulating layers 15 of the actuators 17 in the vibration application means 3. Each of these switches 18 includes a fixed electrode 19, and a movable electrode 20 that moves into contact with and away from the fixed electrode 19.

The fixed electrode 19 is substantially circular, and is provided on a printed wiring board 21 disposed on the back side of the vibration application means 3. A substantially annular movable-electrode connecting terminal 20a is provided on the printed wiring board 21 such as to surround the fixed electrode 19. The fixed electrode 19 and the movable-electrode connecting terminal 20a are electrically connected to an unillustrated predetermined conductive pattern provided on the printed wiring board 21 in a known manner.

The movable electrode 20 faces the fixed electrode 19, and is electrically connected to the movable-electrode connecting terminal 20a provided on the printed wiring board 21.

The shapes of the fixed electrode 19, the movable electrode 20, and the movable-electrode connecting terminal 20a can be chosen from various known shapes, as necessary for the design concept or the like.

The number and positions of the switches 18 used in the secondary input means 4 can be set, as necessary for the design concept or the like.

That is, it is satisfactory as long as the second input means 4 has at least one switch 18 that can perform switching in response to the pressing force applied to the control panel 6. For example, in a case in which the secondary input means 4 is used in a control unit of a mobile telephone in which control keys are arranged, it can be disposed corresponding to the control keys.

In a case in which the input device 1 of this embodiment is placed on a screen of a display of an electronic apparatus, it is important for at least a portion of the secondary input means 4 disposed on the screen to be transparent.

For example, the secondary input means 4 can be made transparent by forming the fixed electrodes 19, the movable-electrode connecting terminals 20a, and the conductive patterns by transparent conductive films, such as ITO (indium tin oxide), by forming the movable electrodes 20 by stacking transparent conductive films, such as ITO (indium tin oxide) by vapor deposition on inner surfaces of dome-shaped flexible and transparent films made of an insulating transparent material, such as polyester, polyimide, and polyethylene terephthalate, and having a thickness of approximately 10 to 30 μm, and by forming the printed wiring board 21 by an insulating transparent material such as polyimide or polyethylene terephthalate.

In this secondary input means 4, when a portion of the surface of the touch panel 6a is provided above the movable electrode 20 is depressed and thereby deformed, for example, by the finger, the movable electrode 20 is brought into contact with the corresponding fixed electrode 19.

The printed wiring board 21 of the secondary input means 4 may have flexibility. Further, the secondary input means 4 may be provided, as necessary. The above-described touch panel 6a may be used as the secondary input means 4.

Referring again to FIG. 2, the input device 1 of this embodiment includes the control means 5 for controlling operations of the components. At least the input means 2, the vibration application means 3, and the secondary input means 4 are electrically connected to the control means 5. The control means 5 includes at least a CPU 22 and a memory 23 formed of a ROM or a RAM having an appropriate capacity. The memory 23 stores a vibration program necessary for controlling the components and data on the program so as to drive a preset actuator 17 among a plurality of actuators 17, for example, an actuator 17 is provided directly below an operated portion on the touch panel 6a or provided above a switch 18 of the secondary input means 4 that sends an ON signal (input information), on the basis of at least coordinate information about the touched touch panel 6a, or the input information (ON signal) obtained from the switch 18 that performs switching in response to the touch of the touch panel 6a.

It is possible to set the operated position on the touch panel 6a or which actuator 17 should be driven when a switch 18 is operated, as necessary for the design concept and specifications. Of course, a plurality of actuators 17 may be driven.

The memory 23 also stores a coordinate value calculation program and data used to determine which position on the surface of the touch panel 6a is pressed, for example, by the finger of the operator, various programs, such as a program for initialization at power-on, and various data such as past data obtained by an input operation.

For example, when the memory 23 of the control means 5 stores a vibration program and data used to control the actuator 17 of the vibration application means 4 to be driven, according to coordinate information input from the touch panel 6a, the secondary input means 4 does not need to be provided. That is, the actuator 17 to be driven can be controlled according to the coordinate information input from the touch panel 6a. This allows the secondary input means 4 to be omitted from the input device 1. As a result, the thickness of the input device 1 can be reduced.

In a case in which the input device 1 of this embodiment is used in a control unit of a mobile telephone, control keys of the control unit can be used as the switches 18 of the secondary input means 4.

Operations of this embodiment having the above-described configuration will now be described.

According to the input device 1 of this embodiment, when the operator presses the surface of the touch panel 6a with the finger or the like, a pressed portion is elastically deformed downward in the thickness direction by the pressing force. Moreover, the conductor pattern 8 of one of the film substrates 7 in the input means 2 is brought into contact with the conductor pattern 8 of the other film substrate 7 by the elastic deformation, and a current flows therebetween. In this case, the control means 5 detects input coordinate information about the operated portion on the touch panel 6a on the basis of an intersection on the x and y coordinates. That is, the control means 5 determines which portion on the touch panel 6a is pressed by the operator.

By elastic deformation of the touch panel 6a, a portion of the vibration application means 3 is provided below the operated portion is similarly elastically deformed, a movable electrode 20 of a switch 18 is provided below the operated portion, of the switches 18 of the secondary input means 4 is provided on the back side of the vibration application means 3, is brought into contact with the corresponding fixed electrode 19, and a signal (ON signal) is sent to the control means 5.

Then, according to the vibration program and data stored in the memory 23, the control means 5 controls the external driving circuit, which passes current through the electrodes 12, so as to drive a preset actuator 17 of a plurality of actuators 17, for example, an actuator 17 is provided above the switch 18 from which the signal is sent, that is, an actuator 17 is provided below the operated portion on the touch panel 6a, on the basis of the coordinate information about the touch panel 6a obtained by the touch of the touch panel 6a, or the input information (ON signal) obtained from the switch 18 in the second input means 4 that performs switching in response to the touch of the touch panel 6a. Consequently, current is passed only through an electrode 12 of the actuator 17 to be driven, of the electrodes 12. As a result, the actuator 17 is provided below the operated portion on the touch panel 6a, more specifically, the insulating layer 15 in the actuator 17 is expanded and contracted by means of an electrostrictive effect, and produces vibration. The operated portion on the touch panel 6a is locally vibrated by the vibration of the actuator 17, and feedback on the input operation is given to the operator with vibration.

In this way, according to the input device 1 of this embodiment, since the touch panel 6a can be locally vibrated, power consumption can be easily and reliably made lower than in the case in which the entire touch panel 6a is vibrated.

According to the input device 1 of this embodiment, since the operated portion on the touch panel 6a is locally vibrated, the operator can determine whether the input operation is properly performed. As a result, it is possible to prevent an input error of operating a portion different from a correct portion, and therefore, operability can be improved easily.

Further, according to the input device 1 of this embodiment, the insulating layers 15 of the actuators 17 is adjacent to the first and second electrodes 13 and 14 in the surface direction, and one of two adjacent actuators 17 can share the electrode 12 with the other actuator 17. This can reduce the number of electrodes 12. As a result, the actuators 17 can be easily arranged with high density, and therefore, feedback can be given with a finer feeling.

Figure 4:
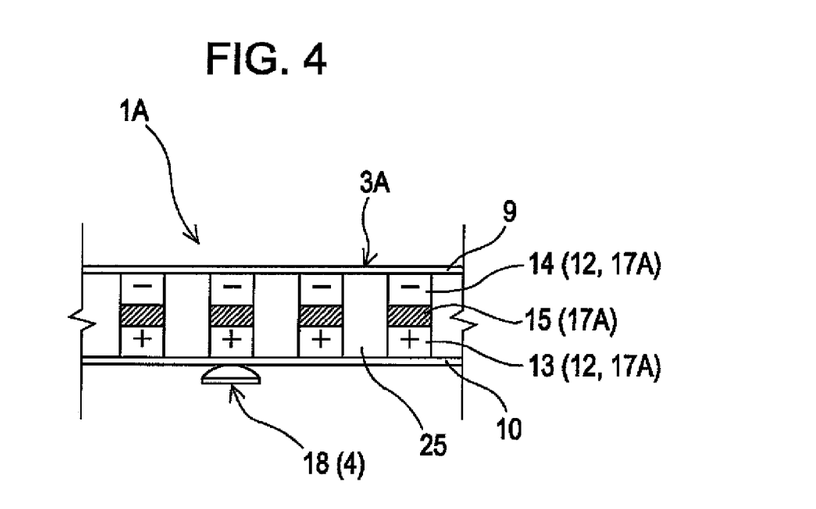
FIG. 4 is an exaggerated cross-sectional view of the principal part of a vibration application means in an input device according to a second embodiment of the present invention.

FIG. 4 is an exaggerated cross-sectional view of the principal part of a vibration application means in an input device according to a second embodiment of the present invention.

As shown in FIG. 4, in a vibration application means 3A in an input means 1A of this embodiment, a first electrode 13, an insulating layer 15, and a second electrode 14 in each actuator 17A are stacked in the thickness direction of the input means 1A. An intermediate insulating layer 25 made of the same material as that of the elastic low dielectric layer 11 is provided between each two adjacent actuators 17A.

That is, in the vibration application means 3A of this embodiment, the first electrodes 13 are provided on an upper surface of a lower substrate 10, the insulating layers 15 are provided on upper surfaces of the first electrodes 13, the second electrodes 14 are provided on upper surfaces of the insulating layer 15, and a lower surface of an upper substrate 9 is provided on upper surfaces of the second electrodes 14. The short-circuit preventing intermediate insulating layer 25 having elasticity is provided between each two adjacent actuators 17A.

The actuators 17A may be arranged in lines or in a lattice form between the upper substrate 9 and the lower substrate 10.

The positions of the first electrode 13 and the second electrode 14 in each actuator 17 may be reversed.

The arrangement of the electrodes 12 may differ in a direction parallel to the surface direction of two adjacent actuators 17A. That is, actuators 17A in each of which the first electrode 13, the insulating layer 15, and the second electrode 14 are stacked from below in the thickness direction, and actuators 17A in each of which the second electrode 14, the insulating layer 15, and the first electrode 13 are stacked from below may be alternately arranged in the surface direction, or units each composed of a plurality of actuators 17A of one of the above-described types and units each composed of a plurality of actuators 17A of the other type may be alternately arranged in the surface direction.

Since other structures are similar to those in the vibration application means 3 of the above-described input device 1 according to the first embodiment, detailed descriptions thereof are omitted.

The input means 1A of this embodiment having this configuration can provide advantages similar to those of the above-described input device 1 of the first embodiment. Moreover, since the insulating layers 15 are provided between the electrodes 12 stacked in the thickness direction in the actuators 17A of the vibration application means 3A, flexibility of deformation of the insulating layers 15 in the thickness direction can be increased. Further, the degree of restraint of the actuators 17 by the intermediate insulating layers 25 can be made smaller than in the case in which the intermediate insulating layers 25 are formed of an inelastic material. Vibrations can be obtained from the actuators 17A of the vibration application means 3A in a linear manner when the actuators 17A are arranged in lines, and in a dot manner when the actuators 17A are arranged in a lattice form.

Figure 5:
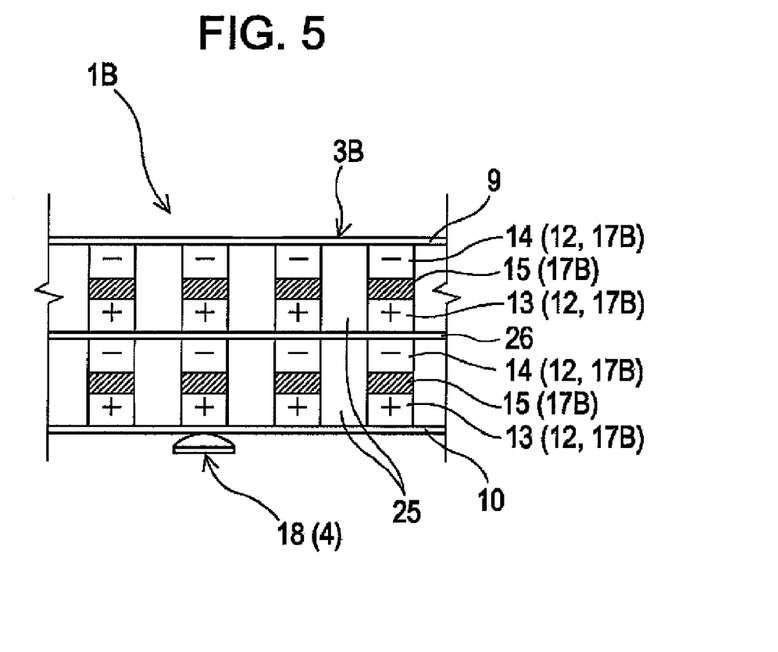
FIG. 5 is an exaggerated cross-sectional view of the principal part of a vibration application means in an input device according to a third embodiment of the present invention.

FIG. 5 is an exaggerated cross-sectional view of a vibration application means in an input device according to a third embodiment of the present invention.

As shown in FIG. 5, in a vibration application means 3B of an input means 1B according to this embodiment, a first electrode 13, an insulating layer 15, and a second electrode 14 are stacked in each actuator 17B in the thickness direction of the input means 1B, and the actuators 17B are provided to form multiple layers, two layers in this embodiment, stacked in the thickness direction of the input means 1B in a manner such that an interlayer insulating layer 26 is provided between the layers. Similarly to upper and lower substrates 9 and 10, the interlayer insulating layer 26 is made flexible and transparent by being formed of an insulating material such as polyester, polyimide, or polyethylene terephthalate.

The number of layers of the actuators 17B stacked in the thickness direction of the input means 1B may be determined, as necessary for a design concept or the like.

Since other structures are similar to those of the vibration application means 3A in the above-described input device 1A according to the first embodiment, detailed descriptions thereof are omitted.

The input device 1B of this embodiment having this configuration can provide advantages similar to those of the above-described input device 1A of the second embodiment, and can increase vibration produced by the actuators 17B in the vibration application means 3B.

Figure 6:
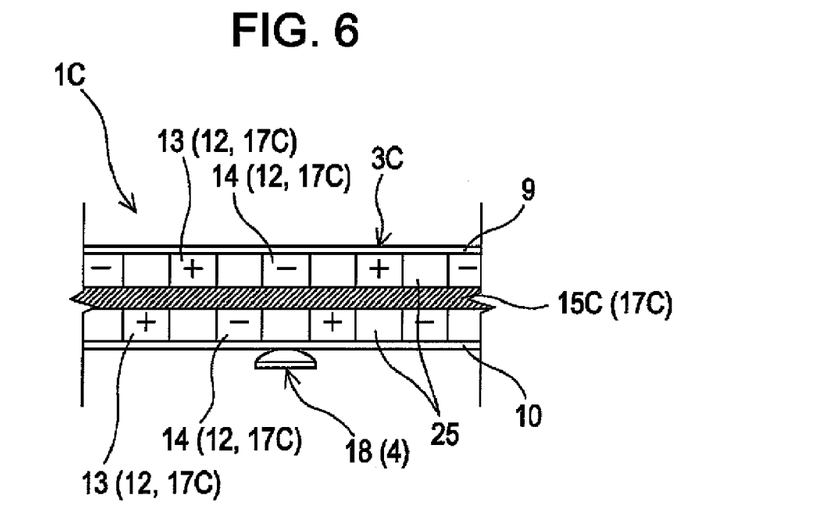
FIG. 6 is an exaggerated cross-sectional view of the principal part of a vibration application means in an input device according to a fourth embodiment of the present invention.

FIG. 6 is an exaggerated cross-sectional view of the principal part of a vibration application means in an input device according to a fourth embodiment of the present invention.

As shown in FIG. 6, in a vibration application means 3C of an input means 1C of this embodiment, an insulating layer 15C that constitutes a part of an actuator 17C is shaped like a sheet, and first electrodes 13 and second electrodes 14 are provided on both sides of the insulating layer 15C in the thickness direction so as not to overlap with each other. For example, first and second electrodes 13 and 14 of a linear shape are alternately arranged parallel to each other on both sides of the insulating layer 15C in the thickness direction, that is, the electrodes are arranged in stripes with no space therebetween, when viewed from above. The electrodes 12 may be arranged in any form as long as the first electrodes 13 and the second electrodes 14 do not overlap with each other. The electrodes 12 may be arranged in a lattice form as a whole.

Short-circuit preventing intermediate insulating layers 25 made of the same material as that of the low dielectric layer 11 are arranged between the electrodes 12 that are adjacent in a direction parallel to the surfaces of the actuators 17C serving as the right-left direction in FIG. 6.

It is important to apply different voltages to the electrodes 12 adjacent in the thickness direction and having the same polarity so that a potential difference is formed therebetween by the voltage application.

Since other structures are similar to those in the above-described input device 1 according to the first embodiment, detailed descriptions thereof are omitted.

The input device 1C of this embodiment having this configuration can provide advantages similar to those of the above-described input device 1 of the first embodiment, and can produce complicated vibration by the actuators 17C of the vibration application means 3C, for example, produce rippling vibration.

Figure 7:
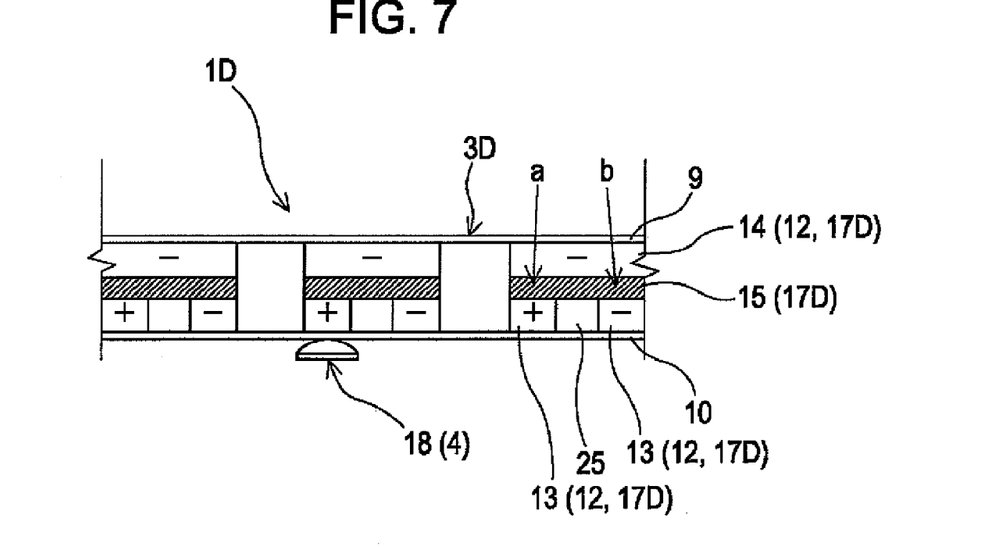
FIG. 7 is an exaggerated cross-sectional view of the principal part of a vibration application means in an input device according to a fifth embodiment of the present invention.

FIG. 7 is an exaggerated cross-sectional view of a vibration application means in an input device according to a fifth embodiment o the present invention.

As shown in FIG. 7, in a vibration application means 3D of an input device 1D of this embodiment, a first electrode 13, an insulating layer 15, and a second electrode 14 are stacked in the thickness direction in each actuator 17D, and one of the first electrode 13 and the second electrode 14 is divided. In this embodiment, the first electrode 13 is provided on a lower substrate 10 is divided into two sections arranged with a space therebetween.

That is, in the vibration application means 3D of this embodiment, each actuator 17D includes three electrodes 12.

A short-circuit preventing intermediate insulating layer 25 formed of the same material as that of the elastic low dielectric layer 11 is provided between the electrodes 12 that are divided such as to be adjacent in a direction parallel to the surfaces of the first electrode 13 of the actuator 17D extending in the right-left direction of FIG. 7.

In each actuator 17D, it is important to apply different voltages to the electrodes 12 adjacent in the thickness direction and having the same polarity so as to form a potential difference therebetween by the voltage application.

Since other structures are similar to those of the above-described input device 1 of the first embodiment, detailed descriptions thereof are omitted.

The input device 1D of this embodiment having this configuration can provide advantages similar to those of the above-described input device 1 of the first embodiment, and can make vibration of the actuators 17D in the vibration application means 3D more complicated.

That is, vibration is strong in a portion where the upper and lower electrodes 12 in each actuator 17D have different polarities (shown by arrow "a" in FIG. 7), and vibration is weak in a portion where the electrodes 12 have the same polarity (shown by arrow "b" in FIG. 7).

Figure 8:
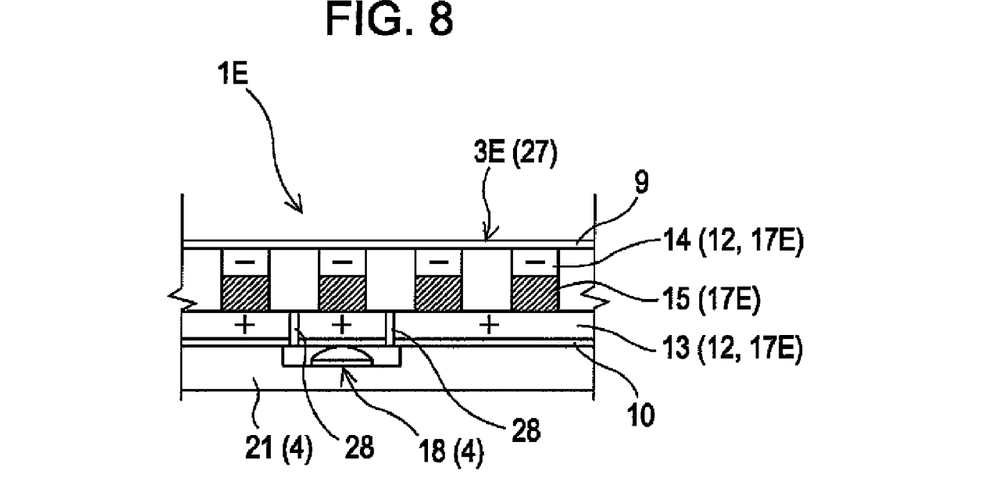
FIG. 8 is an exaggerated cross-sectional view of the principal part of a vibration application means in an input device according to a sixth embodiment of the present invention.

FIG. 8 is an exaggerated cross-sectional view of a vibration application means in an input device according to a sixth embodiment of the present invention.

A vibration application means 3E in an input means 1E of this embodiment includes a sound generating means 27 that generates audible sound by moving electrodes 12 when actuators 17 are driven.

That is, in the vibration application means 3E of this embodiment, a sheet-shaped first electrode 13 is provided on an upper surface of a lower substrate 10, and insulating layers 15 and second electrodes 14 are stacked on the first electrode 13 in this order in the thickness direction.

A through hole 28 is provided between actuators 17E near each switch 18, and extends through the lower substrate 10E and the first electrode 13 in the thickness direction. The through hole 28 prevents an increase of the pressure in the switch 18 by letting out air from the space in the switch 18 when the switch 18 is pressed. The number, size, and shape of the through holes 28 can be set, as necessary for a design concept or the like.

As the sound generating means 27, a speaker that is operatively associated with the switch 18 may be added.

Since other structures are similar to those in the above-described input device 1 of the first embodiment, detailed descriptions thereof are omitted.

The input device 1E of this embodiment having this configuration can provide advantages similar to those of the above-described input device 1 of the first embodiment, and can give feedback on the input operation to the operator not only by means of a tactile feeling using vibration, but also by means of sound.

The input device of the present invention can be used as an input device mounted on a screen of a display in various electronic apparatuses such as a personal digital assistant (PDA), an automated teller machine (ATM), a tablet, and a car navigation system.

The input device of the present invention can also be used as an input device in a control unit of many electronic apparatuses such as an air conditioner, a radio, a television set, a CD player, and remote controls for the apparatuses. In this case, the input means, the vibration application means, and the secondary input means do not need to be transparent.

The present invention is not limited to the above-described embodiments, and various modifications may be possible, as necessary.

INDUSTRIAL APPLICABILITY

The present invention is useful as an input device that is suited to give feedback on an input operation to an operator by means of vibration when the operator performs the input operation by pressing the input device.

The invention claimed is:

1. An input device comprising:
   an input portion that allows information to be input as touched by an operator;
   a vibrator disposed on a back side of the input portion so as to vibrate the input portion;
   a secondary input portion disposed on a back side of the vibrator, and including at least one switch that is operable to perform switching in response to a pressing force applied to the input portion; and
   a controller that is operable to control operations of the input portion, the vibrator, and the secondary input portion,
   wherein the input portion is a sheet-shaped flexible control panel to which coordinates are input,
   wherein the vibrator is shaped like a flexible sheet, and includes a plurality of actuators arranged as vibration sources,
   wherein each of the actuators includes a first electrode, a second electrode, and an insulating layer, the insulating layer being provided between the first electrode and the second electrode and including a ferroelectric layer,
   wherein the first electrode, the insulating layer, and the second electrode in the actuator are stacked in a thickness direction, the insulating layer of the actuator is shaped like a sheet, and the first electrode and the second electrode are provided on both sides of the insulating layer in the thickness direction in a manner so as not to overlap the electrodes with each other, and
   wherein the controller drives a preset actuator of the actuators according to at least coordinate information from the control panel or a signal output from the switch.

2. The input device according to claim 1, wherein an elastic intermediate insulating layer is provided between two adjacent actuators.

3. The input device according to claim 1, wherein the actuators are provided in multiple layers with an interlayer insulating layer disposed between the layers.

4. The input device according to claim 1, further comprising:
   a sound generator that is operable to generate audible sound,
   wherein the audible sound from the sound generator is formed by vibration of the electrodes caused when the actuator is driven.

* * * * *